(12) United States Patent
Karam

(10) Patent No.: US 8,332,748 B1
(45) Date of Patent: Dec. 11, 2012

(54) MULTI-DIRECTIONAL AUTO-COMPLETE MENU

(75) Inventor: Joseph F Karam, Mountain View, CA (US)

(73) Assignee: Google Inc., Mountain View, CA (US)

( * ) Notice: Subject to any disclaimer, the term of this patent is extended or adjusted under 35 U.S.C. 154(b) by 283 days.

(21) Appl. No.: 12/604,382

(22) Filed: Oct. 22, 2009

(51) Int. Cl.
*G06F 17/00* (2006.01)

(52) U.S. Cl. ........................................ 715/246; 715/780

(58) Field of Classification Search .................. 715/246, 715/780, 785
See application file for complete search history.

(56) References Cited

U.S. PATENT DOCUMENTS

| | | | | |
|---|---|---|---|---|
| 7,676,763 | B2* | 3/2010 | Rummel | 715/841 |
| 2006/0218503 | A1* | 9/2006 | Matthews et al. | 715/779 |
| 2006/0282575 | A1* | 12/2006 | Schultz et al. | 710/62 |
| 2007/0016546 | A1* | 1/2007 | De Vorchik et al. | 707/1 |
| 2007/0067272 | A1* | 3/2007 | Flynt et al. | 707/3 |
| 2007/0245260 | A1* | 10/2007 | Koppert | 715/784 |
| 2008/0109401 | A1* | 5/2008 | Sareen et al. | 707/3 |
| 2008/0172362 | A1* | 7/2008 | Shacham et al. | 707/3 |
| 2008/0172374 | A1* | 7/2008 | Wolosin et al. | 707/5 |
| 2008/0208812 | A1* | 8/2008 | Quoc et al. | 707/3 |
| 2008/0222256 | A1* | 9/2008 | Rosenberg et al. | 709/206 |
| 2008/0235677 | A1* | 9/2008 | Aniszczyk et al. | 717/165 |
| 2008/0282291 | A1* | 11/2008 | Henty | 725/44 |
| 2009/0144234 | A1* | 6/2009 | Sharif et al. | 707/3 |
| 2009/0228825 | A1* | 9/2009 | Van Os et al. | 715/780 |
| 2009/0249198 | A1* | 10/2009 | Davis et al. | 715/261 |
| 2009/0281991 | A1* | 11/2009 | Huynh et al. | 707/3 |
| 2009/0300546 | A1* | 12/2009 | Kwok et al. | 715/825 |
| 2010/0057698 | A1* | 3/2010 | Prasad Kantamneni et al. | 707/4 |
| 2010/0082604 | A1* | 4/2010 | Gutt et al. | 707/721 |
| 2010/0105370 | A1* | 4/2010 | Kruzeniski et al. | 455/414.3 |
| 2010/0281374 | A1* | 11/2010 | Schulz et al. | 715/723 |
| 2010/0312782 | A1* | 12/2010 | Li et al. | 707/769 |
| 2011/0093488 | A1* | 4/2011 | Amacker et al. | 707/767 |

OTHER PUBLICATIONS

Karlson et al., FATHUMB: A Facet-Based Interface for Mobile Search, ACM, CHI 2006 Proceedings, Montreal, Quebec, Canada, Apr. 22-27, 2006, p. 711-720.*

Heimonen et al., Mobile Findex—Supporting Mobile Web Search With Automatic Results Categories, ACM, Mobile HCI07, Singapore, Sep. 9-12, 2007, p. 397-404.*

Bast et al., When You're Lost for Words: Faceted Search With Autocompletion, ACM, SIGIR '06 Workshop on Faceted Search, Seattle, WA, Aug. 10, 2006, p. 1-5.*

* cited by examiner

*Primary Examiner* — Laurie Ries
*Assistant Examiner* — Frank D Mills
(74) *Attorney, Agent, or Firm* — Shumaker & Sieffert, P.A.

(57) ABSTRACT

Methods and apparatus, including computer program products, implementing and using techniques completing a user entry in an entry field displayed on a user interface of a computing device. An entry field is displayed on a display of a computing device. In response to a user entering at least one character into the entry field, two or more distinct auto-complete menus are displayed. Each auto-complete menu is included in a separate display element, and each auto-complete menu contains suggestions that correspond to the current at least one character in the entry field. A computer-implemented method for pre-fetching search query results is also described.

19 Claims, 14 Drawing Sheets

Last keystroke: e

| | |
|---|---|
| Henry Paulino | (802) 667-8729 |
| Helen Leynott | (354) 909-2823 | he|

| | |
|---|---|
| heroes | 160,000,000 results |
| herald sun | 4,230,000 results |
| hewlett packard | 89,100,000 results |
| hello kitty | 28,400,000 results |
| heathrow airport | 2,950,000 results |
| hells kitchen | 2,700,000 results |
| heath ledger | 28,700,000 results |
| heathrow | 14,800,000 results |
| hernia | 5,130,000 results |
| hermes | 35,400,000 results |

FIG. 3

Last keystroke: ↵

*Calling...* Helen Leynott
(354) 909-2823

FIG. 12

MULTI-DIRECTIONAL AUTO-COMPLETE MENU

BACKGROUND

This subject matter described herein relates to a graphical user interface for a computing device. Many applications that run on computing devices, such as various types of computers, mobile phones, PDA (personal digital assistants), portable media players, etc., allow users to enter text in text boxes that are displayed on the graphical user interface (GUI). Many companies that provide services available through the Internet, for example, various search engine providers, such as Google Inc. of Mountain View, Calif., use text boxes as a means for users to input various information or search queries, etc.

In order to facilitate the input of text from the user, an auto-complete function is often provided. Typically, when using such a function, a drop-down menu with suggested words is displayed as the user types the text in the text box. The drop-down menu typically changes for each character the user types into the text box in order to provide increasingly relevant suggestions to the user. In some instances the drop-down menu contains different categories of suggestions. This is the case, for example, in the text search box provided in Google Toolbar, a browser plug-in available from Google Inc. For example, the auto-complete drop-down menu can be divided into suggestions matching one or more of the following three different data types: (i) spelling corrections, (ii) search history, and (iii) query suggestions. Having a drop-down menu with the suggestions arranged into categories may make it easier for the user to more quickly find the particular suggestion that matches the word the user is about to enter into the text box.

Another example includes the Spotlight software, for the Macintosh OS X operating system, provided by Apple Inc. of Cupertino, Calif. Spotlight is a system wide desktop feature that displays an auto-complete drop-down that offers suggestions of many different data types when a user starts typing a word in the text box. Some examples of data types include Applications, System Preferences, Documents, Folders, Mail Messages, Contacts, Events & To Do Items, Images, PDF Documents, Bookmarks, Music, Movies, Fonts, etc. That is, not only search queries are suggested, but also names of local files on the user's computer that the user may want to access.

In both of the above examples, the suggested words are displayed within a single drop-down menu. As was discussed above, the drop-down menu can be segmented into different sections with titles acting as delimiters, but ultimately suggestions are still presented as a single list. As a result, keyboard access to, say, the first item of the third section of the drop-down menu, requires stepping through the first two sections before reaching the third section which contains the relevant suggestion. This can often be a nuisance to the user, especially on mobile devices.

SUMMARY

In general, in one aspect, the various implementations provide methods and apparatus, including computer program products, for implementing and using techniques for completing a user entry in an entry field displayed on a user interface of a computing device. An entry field is displayed on a display of a computing device. In response to a user entering at least one character into the entry field, two or more distinct auto-complete menus are displayed. Each auto-complete menu is included in a separate display element, and each auto-complete menu contains suggestions that correspond to the current at least one character in the entry field.

Implementations can include one or more of the following features. At least one additional character entry can be received into the entry field and the auto-complete menus can be updated to display increasingly relevant suggestions, based on the current characters in the entry field. A user selection of a suggestion in one of the auto-complete menus can be received to complete the user entry in the entry field. Each auto-complete menu can contain a distinct category of suggestions. The categories of suggestions can include contact entries, suggested search queries, spelling corrections, computing device applications, computing system preferences, document names, folder names, email messages, to-do items, image names, bookmarks, or media file names.

The two or more auto-complete menus can be displayed adjacent to the entry field. Each of the two or more auto-complete menus can be displayed as a separate menu at a distance from the entry field. Each auto-complete menu can be accessible through a single keystroke by the user when the entry field is in focus. Each auto-complete menu can be accessible through a keyboard shortcut by the user when the entry field is in focus. A user selection of an auto-complete menu can be received and, in response to receiving the user selection, the selected auto-complete menu can be split into two or more sub-menus, where each sub-menu contains a sub-category of suggestions to the suggestions in the auto-complete menu, and a user selection of a suggestion in one of the sub-menus can be received to complete the user entry in the entry field.

In general, in one aspect, the various implementations provide methods and apparatus, including computer program products, implementing and using techniques for pre-fetching search query results corresponding to a user entry in a search query box displayed on a user interface of a computing device. A search query box for accepting search terms from a user is provided. In response to a user entering at least one character into the search query box, one or more suggestions for one or more completed search terms are generated. Search results corresponding to the one or more suggestions are pre-fetched and categorized into at least two sets. The at least two sets are displayed so that each result set is included in a separate display results box, which is anchored to the search query box used for entering the search query. In one implementation, the display results boxes can be displayed so that each display results box extends in a cardinal direction relative to the search query box.

Various implementations can include one or more of the following advantages. Users can navigate more quickly to a relevant suggested word, using a smaller number of key presses compared to what is typically possible in current drop-down menus. Users typically know where to look for a particular type of data, rather than having to find a particular section in a long drop-down menu. They would also be able to anticipate which arrow key (or other key) to use on their keyboard in order to start navigating the appropriate drop-down menu.

The details of one or more implementations are set forth in the accompanying drawings and the description below. Other features and advantages will be apparent from the description and drawings, and from the claims.

DESCRIPTION OF DRAWINGS

FIGS. 2-10 show the search query box of FIG. 1 and two changing auto-complete menus, in accordance with one implementation.

FIG. 12 shows a message shown to a user in response to the selection of the contact shown in FIG. 11, in accordance with one implementation.

Like reference symbols in the various drawings indicate like elements.

DETAILED DESCRIPTION

Figure 1:
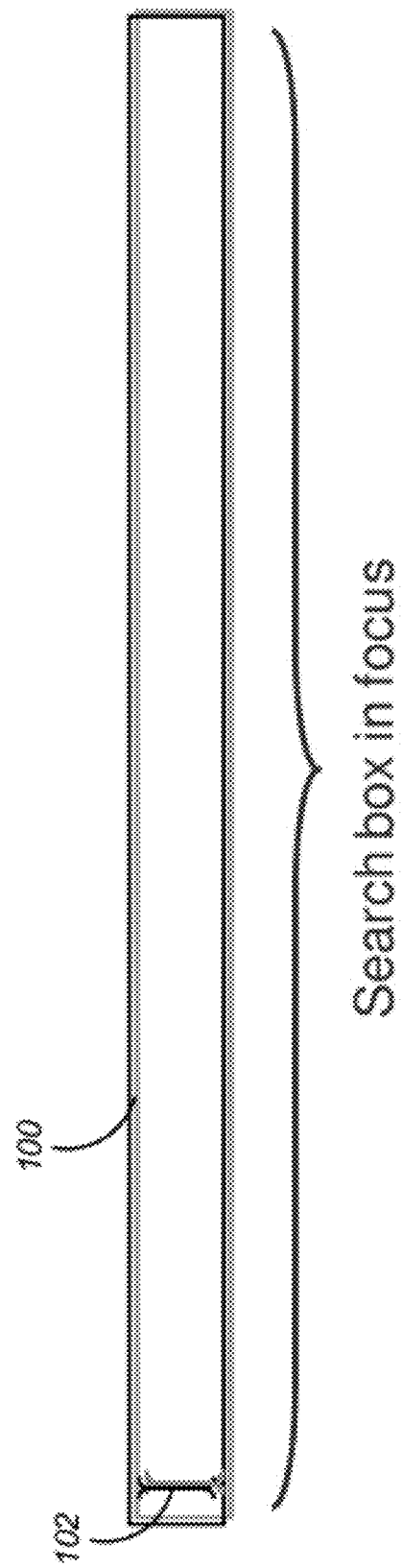
FIG. 1 shows an empty search query box, in accordance with one implementation.

As was described above, the purpose of auto-complete mechanisms is to allow users to complete a text field entry with a minimal number of keystrokes. There are two general ways of minimizing the number of keystrokes. The first one is to attempt to make a "best guess" about the user's intention, by offering a set of matches that is as small, as on target, and based on as few character entries as possible. The implementations described herein are not directed specifically towards trying to solve this "best guess" problem, although techniques for finding a "best guess" can certainly be used in conjunction with the subject matter described herein.

The other general way of minimizing the number of keystrokes is through enabling users to quickly navigate to a desired suggestion. This is what will be discussed in further detail below, by way of example. As will be described below, the various implementations are particularly useful in situations where suggestions are grouped in multiple lists, such as one list for each data type. Usually, existing solutions simply present the suggestions as a single list, as was described above, and attempt to order the list based on various ranking heuristics or algorithms. Some challenges in ordering the list include figuring out the order of the different data types (e.g., whether spelling suggestions should come before query suggestions in the list, whether the data types should be kept separate or intermingled, etc.).

As will be described below, the various implementations described herein may reduce or eliminate the need to solve this ranking problem, because of one or more features that can be applied alone or in combination. A first feature is that navigating to the n:th item of a given list will always take exactly n keystrokes from the input text field. Expressed differently, at any time the input text field is in focus, the user is always n keystrokes away from m different menu items in m different lists. A second feature is that each list may consistently appear at the same place every time the user types an input. A third feature is that the lists may be used primarily in cases where it makes sense to assume that the user already knows what data type they are looking for, for example, when the user starts typing the name of a contact because she is looking for a "telephone number" data type.

To accomplish this, the various implementations described herein enable input text fields, such as search query boxes, to support more than a single auto-complete menu. While traditional auto-complete mechanisms typically offer a single drop-down menu that appears immediately below the text field, the implementations herein allow for a single input to trigger the simultaneous, or nearly simultaneous, appearance of additional auto-complete menus, where each auto-complete menu contains auto-complete suggestions of a different type of data. For instance, a primary auto-complete menu may appear immediately below the input text field, a secondary auto-complete menu may appear immediately above the input text field, a ternary one to the left of the input text field and a quaternary auto-complete menu may appear immediately to the right of the text input field. By being thus positioned, it is easy for a user to navigate to selections within these auto-complete menus by using the keyboard arrows available on most computing device keyboards. Furthermore, a single keystroke (e.g., an arrow stroke) may take the user directly into a relevant data category. Minimizing the number of keystrokes may be particularly valuable for users of mobile computing devices, as these devices have relatively small displays and often lack mouse-like pointing devices. It is also a valuable feature in terms of general accessibility on any type of computing device for people who have difficulties using a computer mouse or equivalent type of pointing device. Various implementations will now be described by way of example with reference to a text input field in a search engine, herein referred to as a search query box. However, as the skilled person realizes, the techniques described herein can be used in essentially any context where a user inputs text in a text input field.

Figure 2:
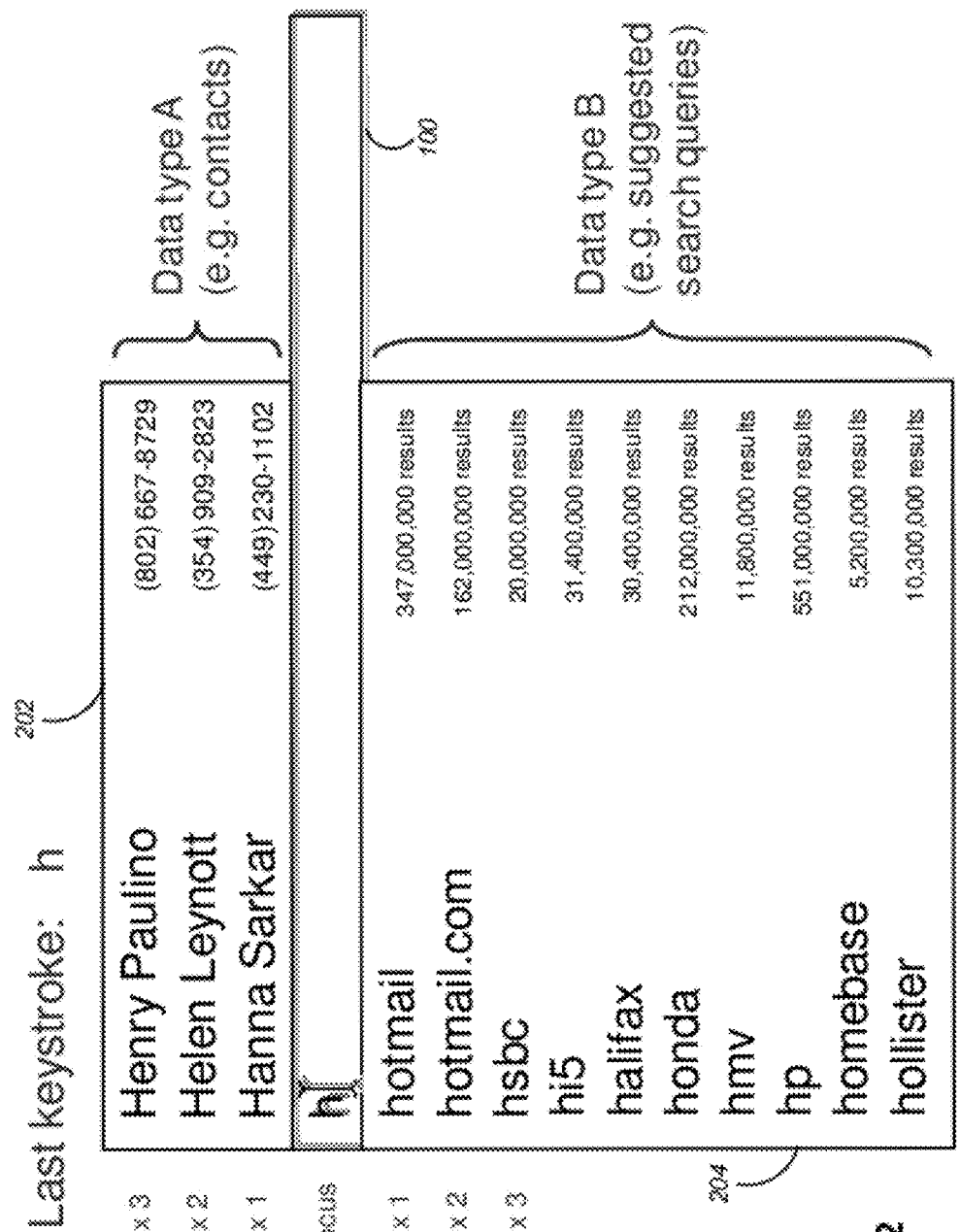

FIG. 1 shows an empty search query box (100) with a cursor (102) inside it. The search query box (100) is in focus, that is, the search query box (100) is ready to receive textual input at the location of the cursor (102) from a user. FIG. 2 shows what happens in response to the user typing the character "h" in the search query box (100). Two auto-complete menus (202; 204) are displayed. The first auto-complete menu (202), which is displayed above the search query box (100) contains a list with suggestions of a first data type, in this case a list of contact names for the user. The second auto-complete menu (204), which is displayed below the search query box (100) contains a list with suggestions of a second data type, in this case a list of suggested search queries. Note that in some implementations, the suggestions in the auto-complete menus are displayed before the actual search query is completed, that is, the suggestions are aimed at completing an incomplete search query entered by the user prior to conducting the actual search. Typically, the same type of data always occur in the same place, that is, the contact list is always shown above the search query box (100) and the list of suggested search queries is always shown below the search query box (100), using the above example. This facilitates for the user to find the right information, since the user will be familiar with what portion on the interface will contain the type of information he or she is looking for.

Figure 4:
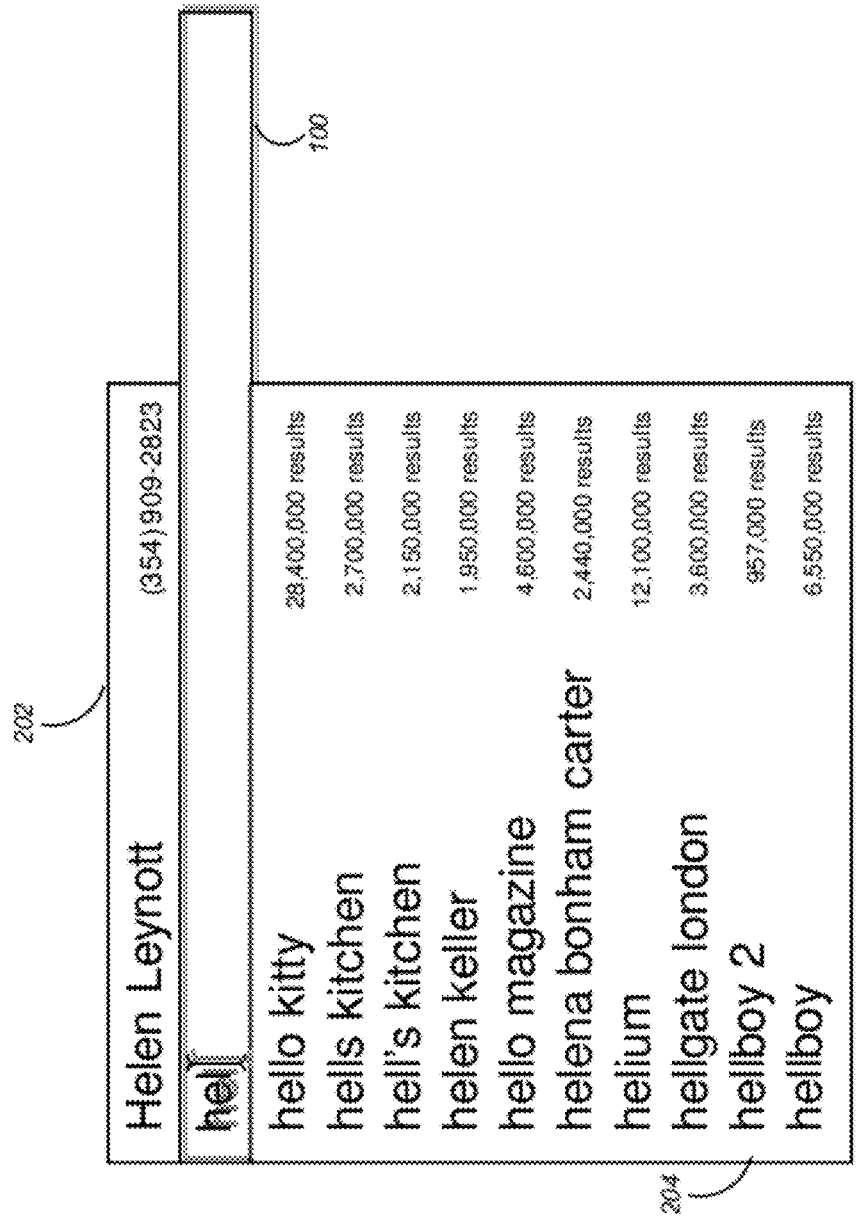

As the user continues to type, the two auto-complete menus (202; 204) change. In FIG. 3, the user has typed the letter "e", which causes the first auto-complete menu (202) to display a smaller selection of contacts that match the "he" letter combination in the search query box (100). The second auto-complete menu (204) displays a modified list of suggestions, which has the same length as the first list, but is more relevant for the "he" letter combination. FIG. 4 shows a similar refinement as shown in FIG. 3, but for the new letter combination "hel". It should be noted that while the second auto-complete menu (204) is illustrated in the figures as having 10 entries, it can have any number of entries that is deemed to be appropriate. The number of entries in the second auto-complete menu (204) can of course also vary dynamically instead of staying the same as the user continues to enter letters into the search query box (100).

Figure 5:
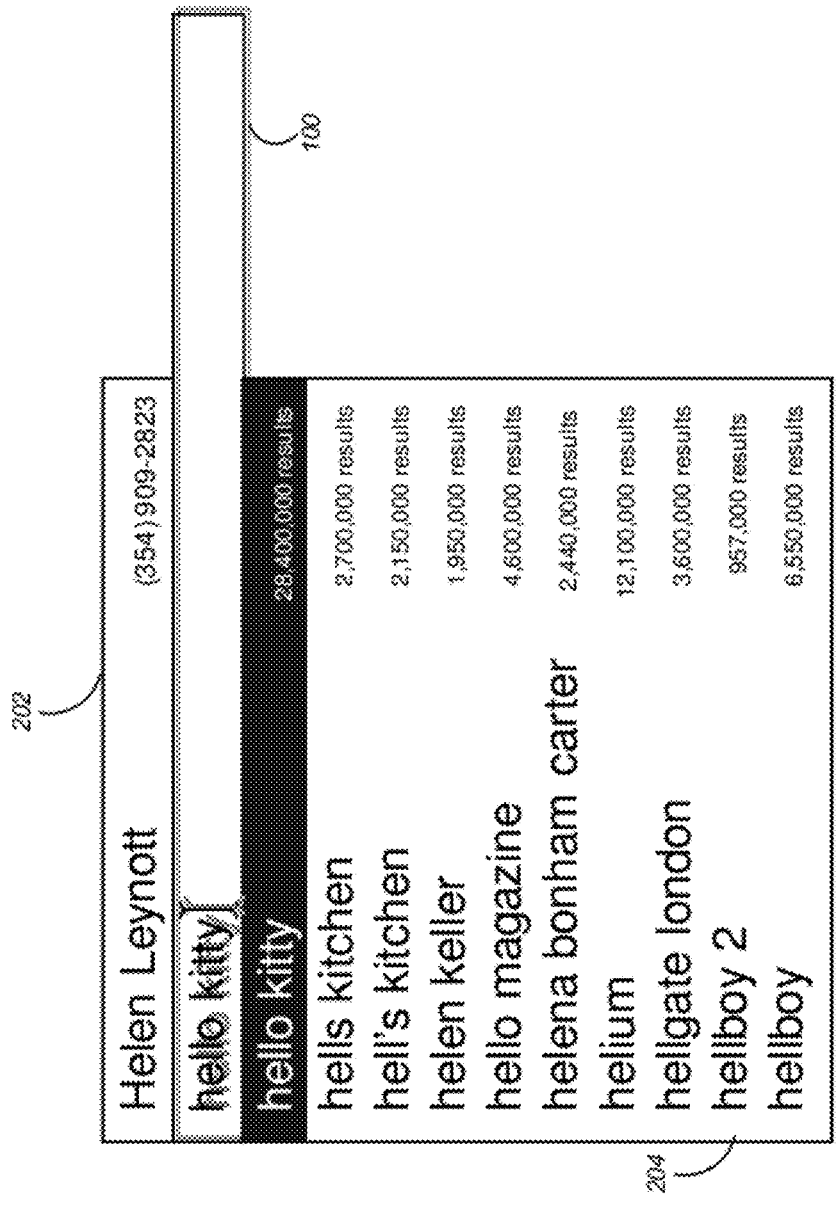
Figure 6:
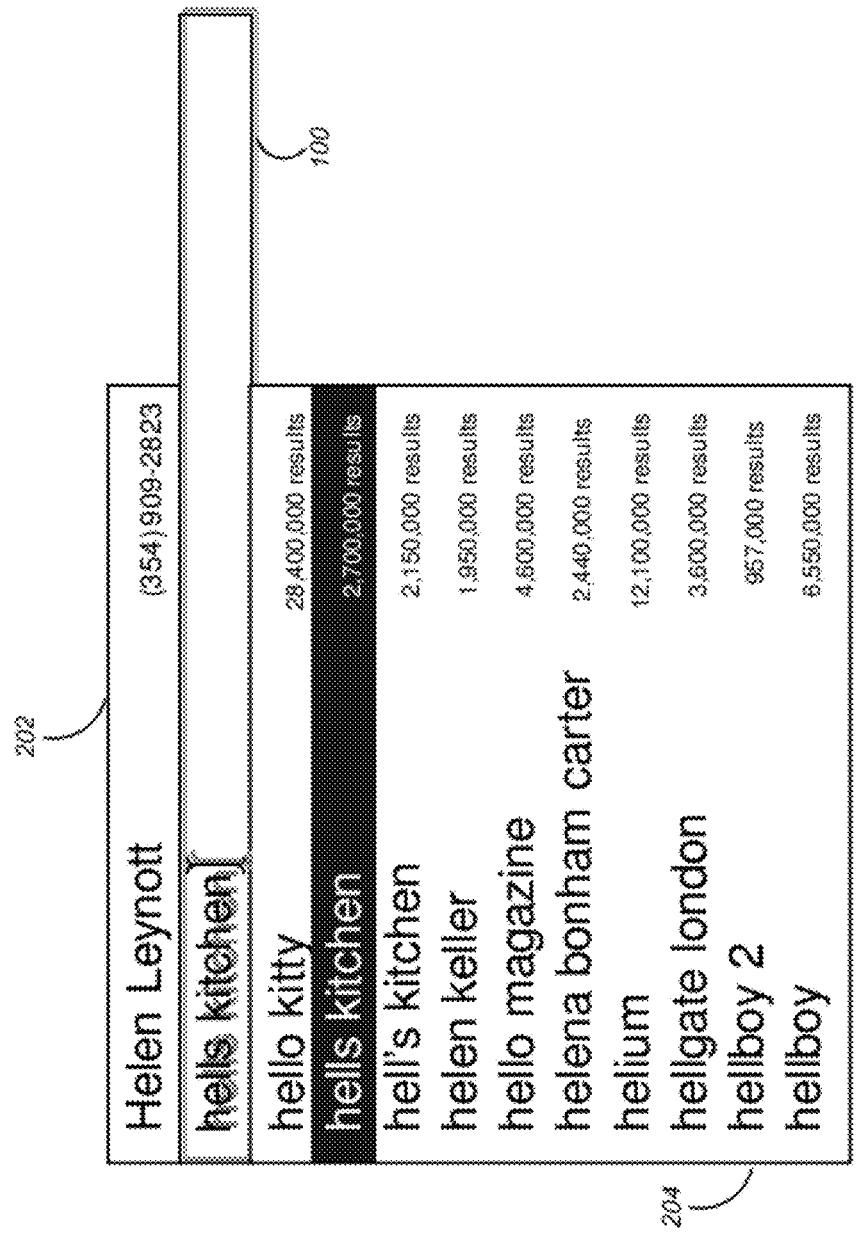
Figure 7:
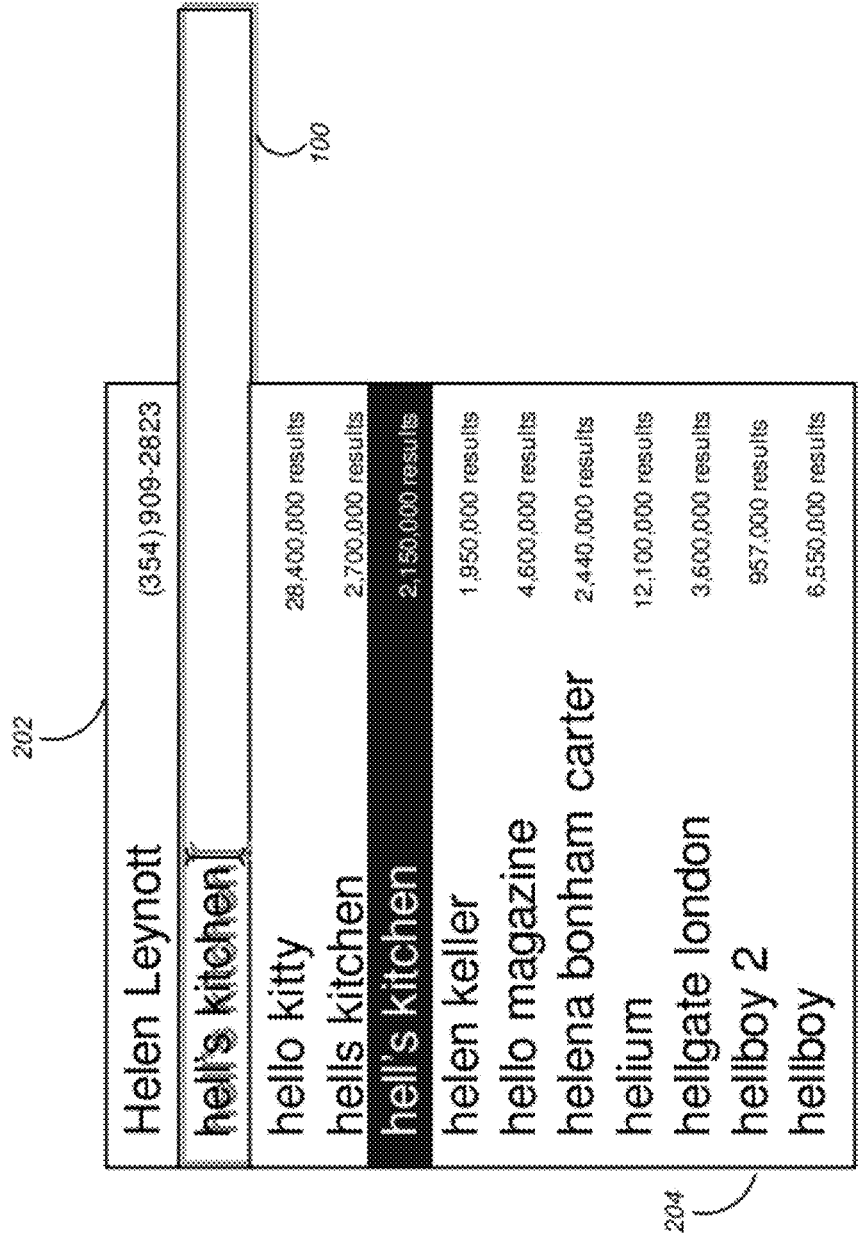
Figure 8:
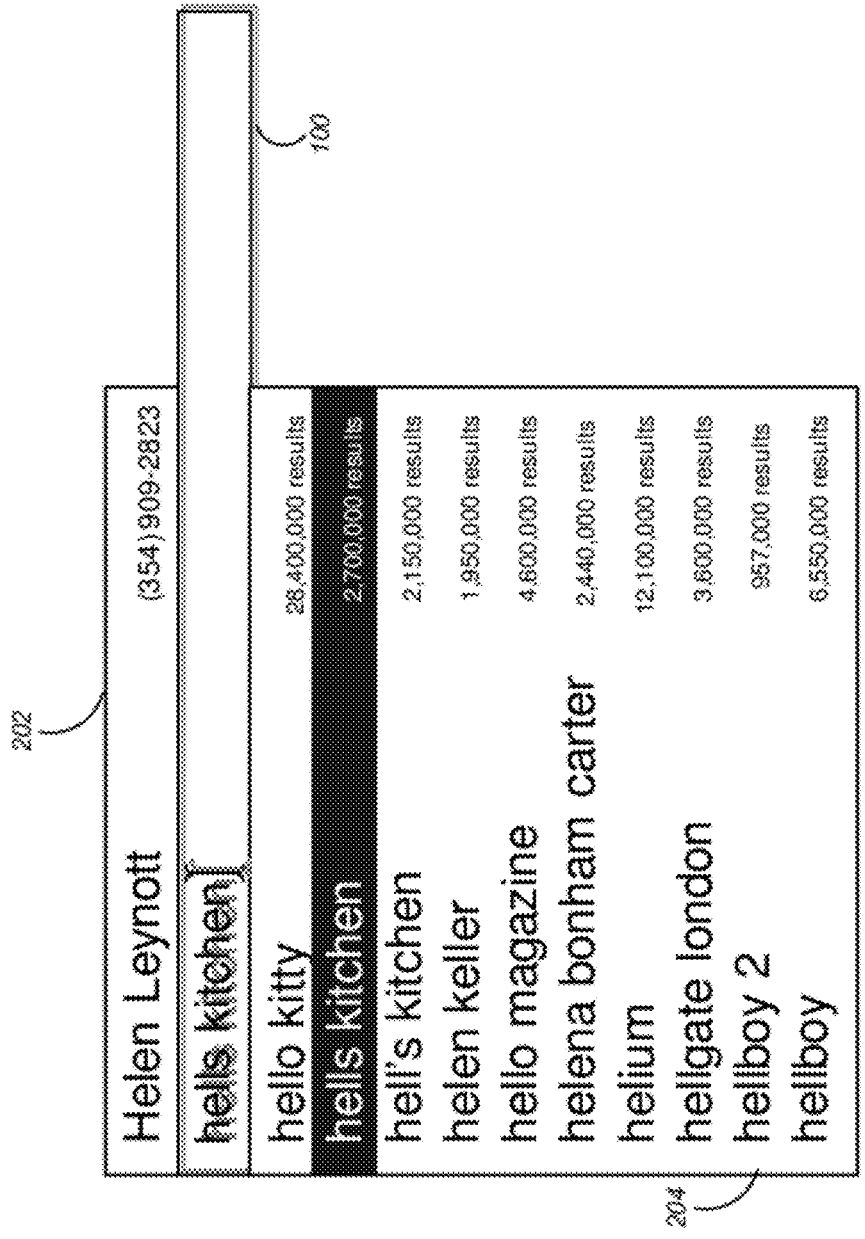
Figure 9:
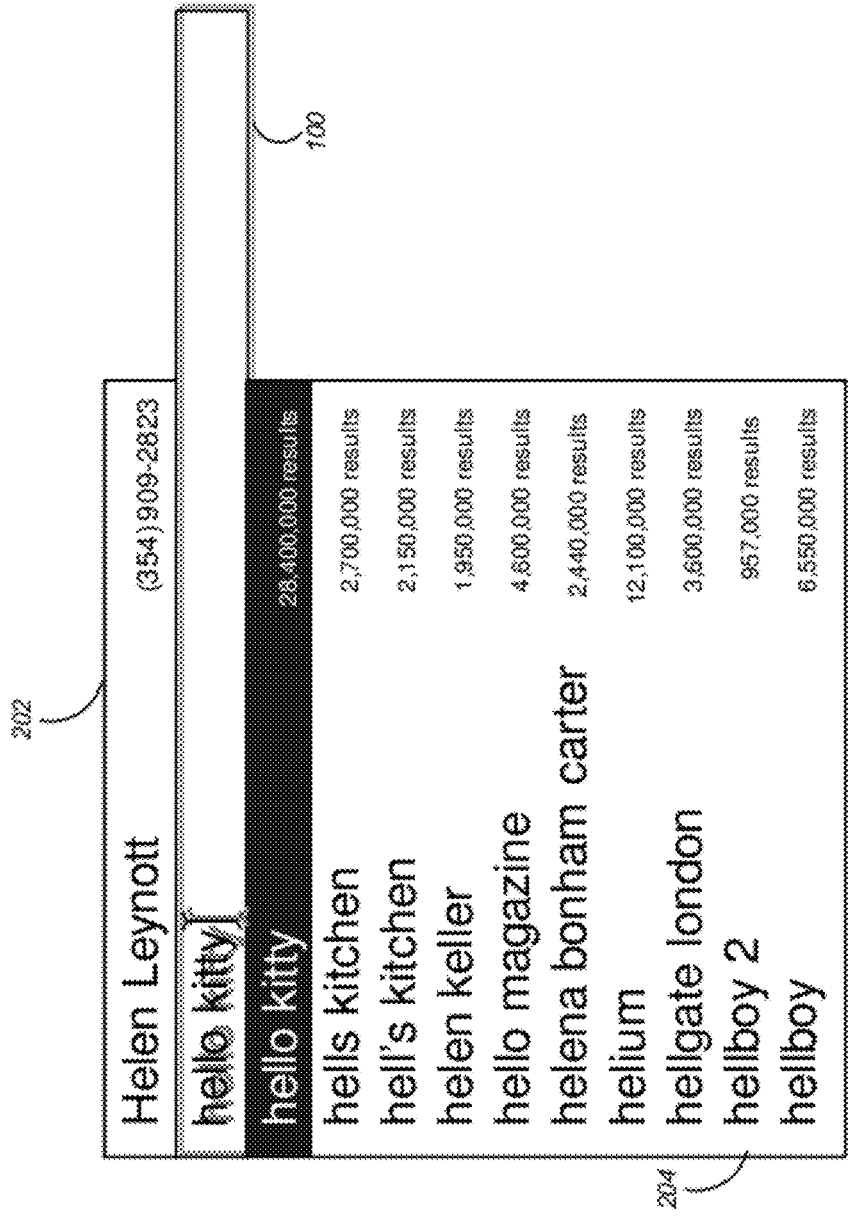

At this point, the user presses the "down arrow" key on his keyboard, which causes the suggestion "hello kitty" (500) in the second auto-complete menu (204) to be highlighted, as shown in FIG. 5. The user can continue to press the down arrow key to step down the second auto-complete menu (204) and highlight different search suggestions, as shown in FIGS. 6 and 7. Similarly, the user can move up through the second auto-complete menu (204) by pressing an "up arrow" on his keyboard, as shown in FIGS. 8 and 9.

Figure 10:
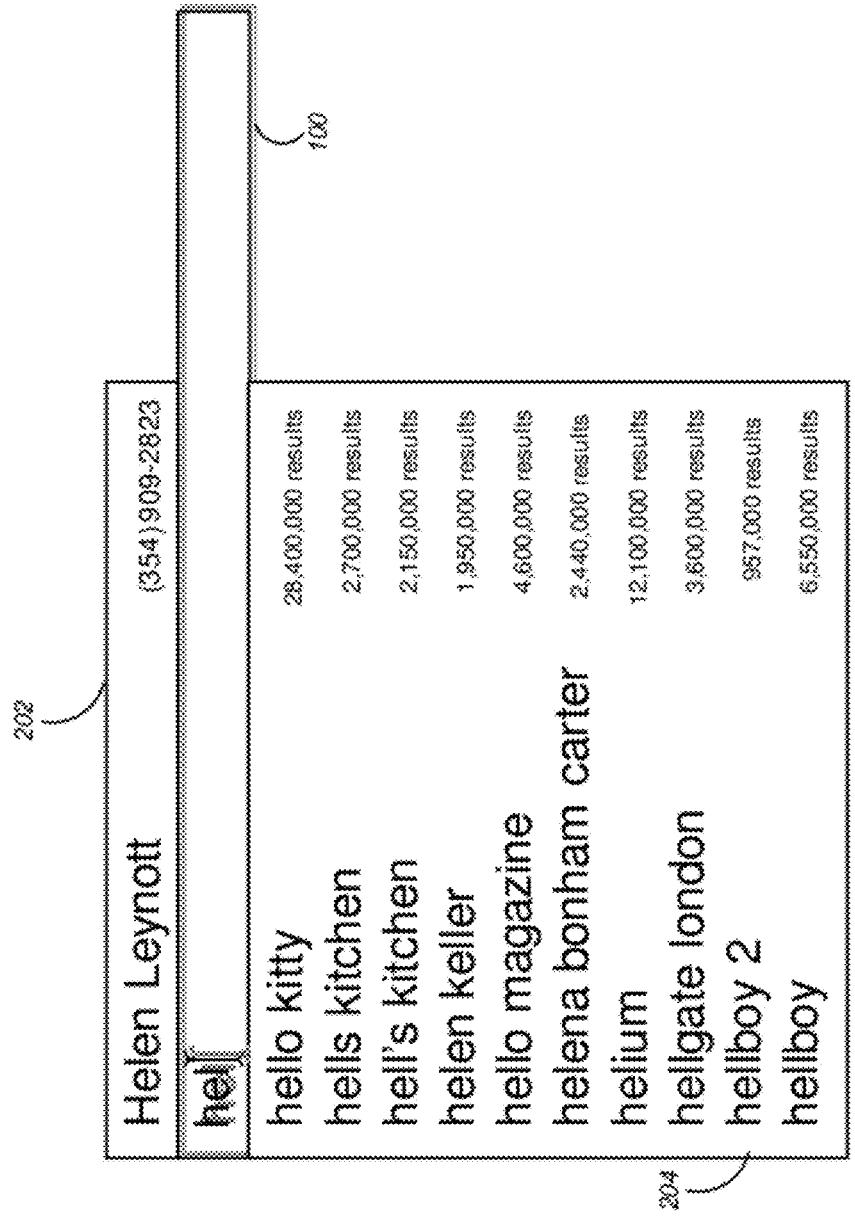
Figure 11:
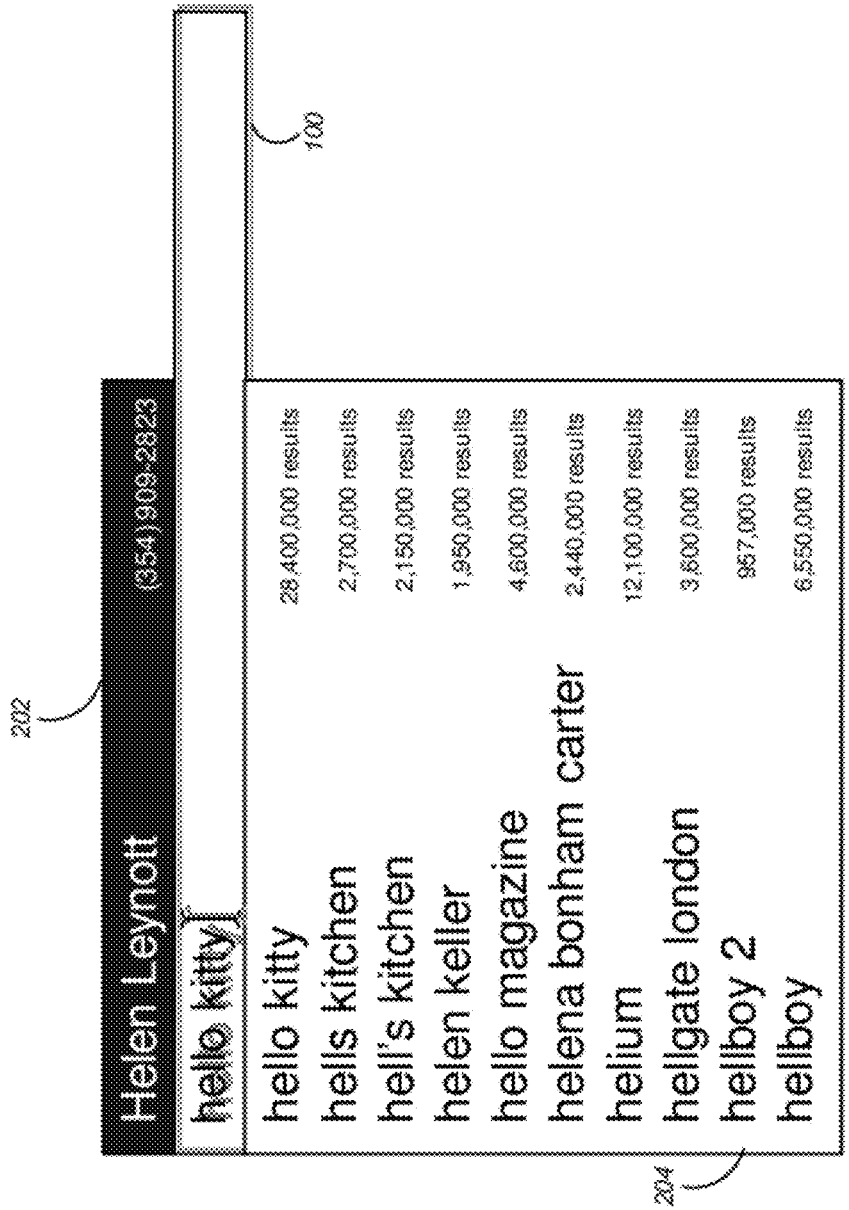
FIG. 11 shows a final user selection of a contact in one of the auto-complete menus, in accordance with one implementation.

Once the user has reached the top of the second auto-complete menu (204) and presses the up arrow again, the search query box (100) is back in focus, as shown in FIG. 10. Another press of the up arrow key causes the first suggestion of the first auto-complete menu (202), "Helen Leynott" to be highlighted, as shown in FIG. 11. The user decides that this is the selection he is interested in and pushes the "enter" key on his computing device. As the selected list entry in this case was a contact, the enter key causes the selected contact to be called, as shown in FIG. 12. It should however, be realized that any other appropriate action can be taken. For example, an e-mail or SMS (short message system) interface could be opened up for a contact, or the user could be presented with a number of options of how he would like to communicate with the selected contact. A selection in the second auto-complete menu (204), on the other hand, typically causes a search to be conducted for the selected search term. As the reader realizes, these are just a few examples, and many further variations are possible.

Figure 13:
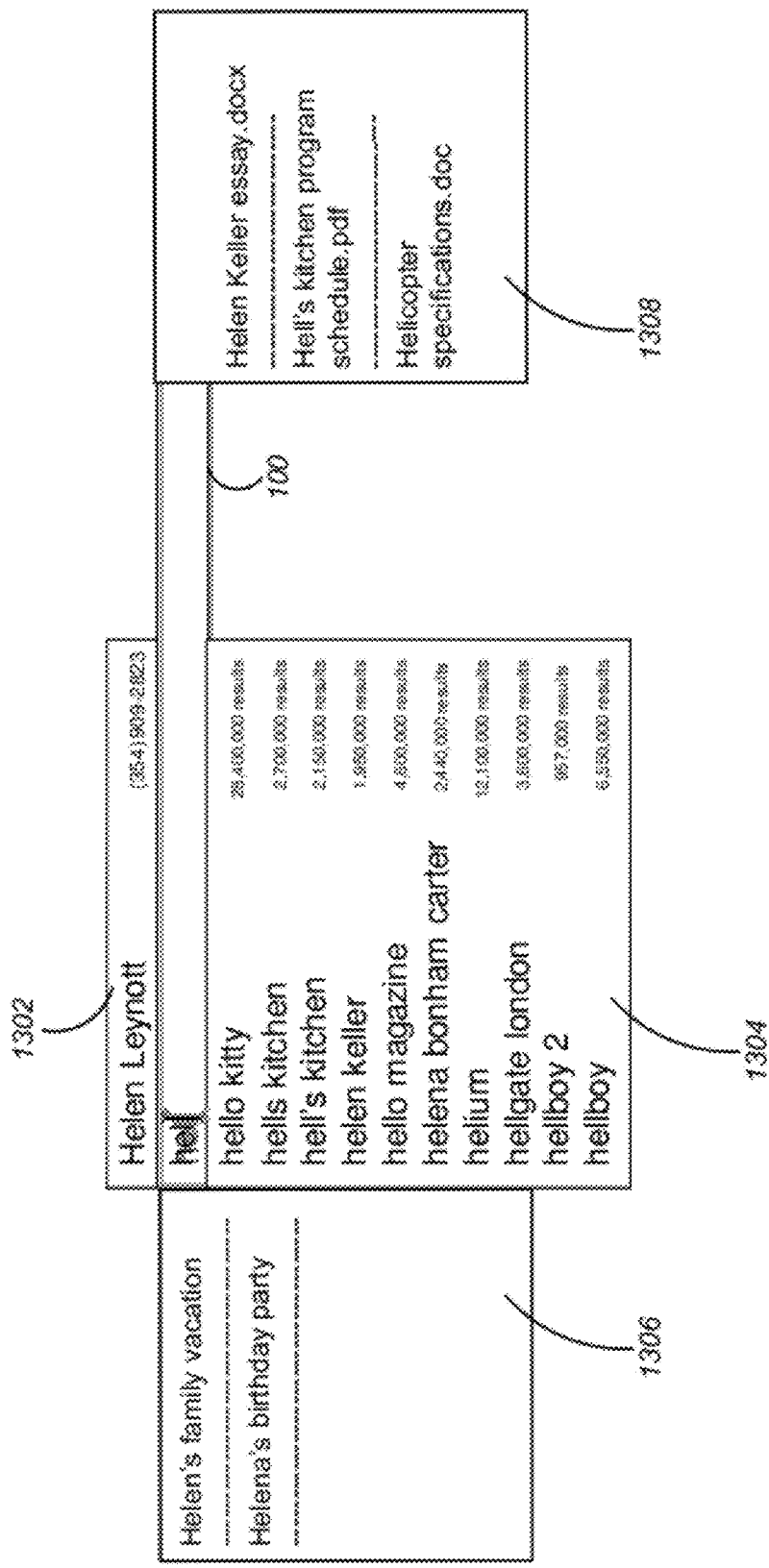
FIG. 13 shows a search query box with four adjacent auto-complete menus, in accordance with one implementation.

For example, there can be more than two auto-complete menus. FIG. 13 shows an implementation where four auto-complete menus (1302, 1304, 1306, 1308) are displayed, one on each side of the text input field (100). Similar to the operations described above with respect to FIGS. 1-12, the auto-complete menus (1306, 1308) located on the respective sides of the search query box (100) can display suggestions matching what the user is entering into the search query box (100). As can be seen in FIG. 13, the left auto-complete menu (1306) shows image results, which can be presented, for example in a textual format with the file names or as image "thumbnails" corresponding to the file names. The right auto-complete menu (1308) contains names of documents located on the user's computer or in some other remote file repository specified by the user. The left and right auto-complete menus are as easily accessible as the top and bottom auto-complete menus, through using the left and right arrow keys on the keyboard of the computing device. Of course, it should be noted that "images", "contacts", "search suggestions", and "documents" are merely examples of different categories of menu items that can be displayed in the auto-complete menus (1302, 1304, 1306, 1308). In many implementations, these categories can be customized by the user to the types of items or suggestions that will be most relevant for the user's purposes. The types of auto-complete menus may also vary depending on the application in which they are used. For example, in a web browser, a search suggestion menu and a history list of previously visited websites may be displayed, whereas in a word processing application, spelling suggestions, definitions, phrases within a certain document where a particular word occurs, etc., can be displayed in the various auto-complete menus.

Figure 14:
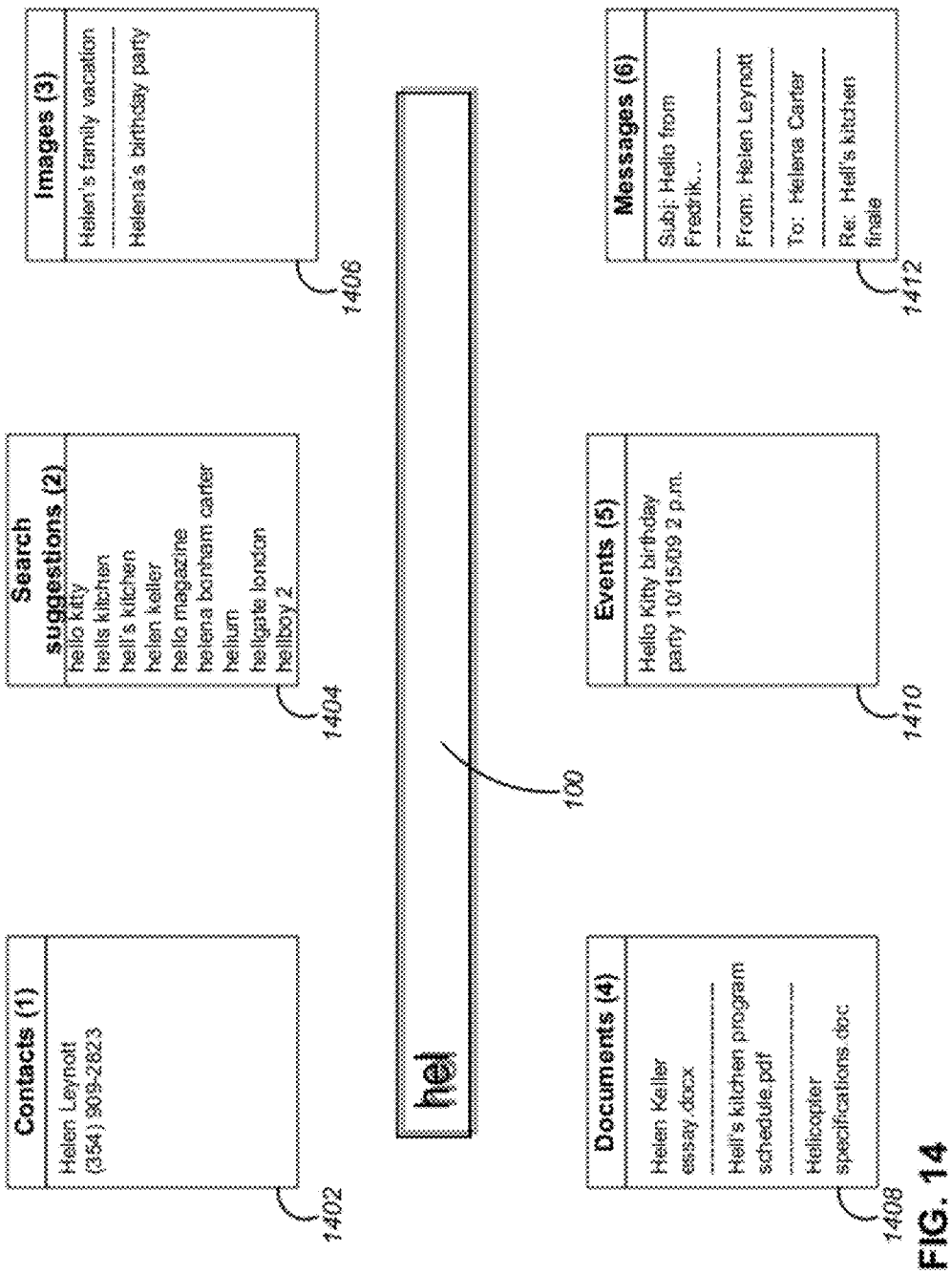
FIG. 14 shows a search query box with six surrounding auto-complete menus, in accordance with one implementation.

Furthermore, it should be noted that various implementations can also support more than four data categories. For example, instead of following a four-directional layout mapping to the four directions of the keyboard arrow keys, the auto-complete menus can be displayed anywhere on the screen. FIG. 14 shows an example of such an implementation. Each auto-complete menu (1402 through 1412) has a header and a number, and to get to the relevant menu, the user simply presses the number of the menu, or some other keyboard shortcut, just as easily as pressing one of the arrow keys on the keyboard. Of course, there may be other ways to navigate to the menus as well, such as using arrow keys or tab keys, etc. Then, after pressing Enter or some other selection key, the arrow keys can be used to navigate to the desired entry within the selected menu, as described above. In some implementations, the suggestions within each auto-complete menu can also be enumerated, such that the user can press, for example "Ctrl+4" to get to auto-complete menu number four (i.e., the Documents menu 108) and then "3" to select the third item listed in that menu.

The above techniques are particularly useful where the search query box is not spatially constrained by other UI elements surrounding it, and where it makes sense to use a single search query box to search multiple data types. One example of such a situation is mobile phone technology, where a text field on the main page could be used to either (i) retrieve a contact's phone number and make a call, or (ii) run a standard web search, as described above. The various implementations described herein can be used by anyone designing an interface that attempts to present the user with suggestions of multiple data types, based on a single user input that is not type-specific.

Various implementations can be realized by means of digital electronic circuitry, or in computer hardware, firmware, software, or in combinations of them. Apparatus can be implemented in a computer program product tangibly embodied in a machine-readable storage device for execution by a programmable processor; and method steps can be performed by a programmable processor executing a program of instructions to perform functions by operating on input data and generating output. Various implementations can include one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the various implementations can run on a computer system having a display device such as a monitor or LCD screen for displaying information to the user. The user can provide input to the computer system through various input devices such as a keyboard and a pointing device, such as a mouse, a trackball, a microphone, a touch-sensitive display, a transducer card reader, a magnetic or paper tape reader, a tablet, a stylus, a voice or handwriting recognizer, or any other well-known input device such as, of course, other computers. The computer system can be programmed to provide a graphical user interface through which computer programs interact with users.

Finally, the processor optionally can be coupled to a computer or telecommunications network, for example, an Internet network, or an intranet network, using a network connection, through which the processor can receive information from the network, or might output information to the network in the course of performing the above-described method steps. Such information, which is often represented as a sequence of instructions to be executed using the processor, may be received from and outputted to the network, for example, in the form of a computer data signal embodied in a carrier wave. The above-described devices and materials will be familiar to those of skill in the computer hardware and software arts.

It should be noted that the various implementations employ computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part are useful machine operations. The manipulations performed are often referred to in terms, such as, producing, identifying, running, determining, comparing, executing, downloading, or detecting.

A number of implementations have been described. Nevertheless, it will be understood that various modifications may be made. For example, various voice recognition techniques can be used in conjunction with the implementations described herein, so that the auto-complete menus are shown in response to the user speaking a word rather than typing the word into the textbox.

In some implementations, there may be branching menus, so that when a particular menu or menu item is selected, it splits into two separate sub-menus. This can be useful, for example, in a contact list, where one sub-menu can show telephone numbers, and another sub-menu can show email addresses for a selected contact.

In some implementations, actual searches can be carried out that correspond to the suggestions in the auto-complete menu. That is, the search results corresponding to the suggestions can actually be pre-fetched to the user's computing device. As a result, when a user selects a suggestion from one of the auto-complete menus, the search results are essentially instantaneously available and the user does not have to wait further for the search of the selected suggestion to be conducted.

As was described above, also here the suggestions can be displayed in a textual format, or as image thumbnails. Having image thumbnails may be particularly useful, for example, when the user is looking for images, web pages, etc. The image thumbnails can also, for example, represent title pages of documents, books, applications, etc., which may further facilitate for the user to find the content she is looking for. In some implementations, in order to further facilitate for the user to find the desired contents, various other techniques can be used in conjunction with displaying suggestions. For example, a callout box with an excerpt from a document can be displayed when a user "mouses over" a suggestion, or an enlarged version of an image thumbnail can be displayed to the user when she mouses over an image thumbnail. Many alternatives to these techniques can be realized by those of ordinary skill in the art, and accordingly, other implementations are within the scope of the following claims.

The invention claimed is:

1. A computer-implemented method for completing a user entry in an entry field displayed on a user interface of a computing device, the method comprising:
   displaying an entry field on a display of a computing device;
   receiving user input of at least one character entered into the entry field;
   responsive to receiving the user input of the at least one character entered into the entry field, generating two or more suggestions for two or more completed search terms based at least in part on the at least one character;
   categorizing the two or more suggestions into at least two categories of suggestions; and
   displaying at least a first and a second distinct auto-complete menu so that each auto-complete menu is included in a separate display element adjacent to the entry field, wherein the first auto-complete menu is positioned in a first direction relative to the entry field and the second auto-complete menu is positioned in a second direction relative to the entry field, wherein the second direction is perpendicular to the first direction, wherein each auto-complete menu contains a different category of suggestions that correspond to the at least one character in the entry field, and wherein each auto-complete menu is accessible through a single keystroke user input.

2. The method of claim 1, further comprising:
   receiving at least one additional character entry into the entry field; and
   updating the auto-complete menus to display increasingly relevant suggestions, based on the at least one character and the at least one additional character in the entry field.

3. The method of claim 1, further comprising:
   receiving a user selection of a suggestion in one of the auto-complete menus to complete the user entry in the entry field.

4. The method of claim 1, wherein the category of suggestions depend on an application, executed by the computing device, in which the entry field is used.

5. The method of claim 1, wherein the categories of suggestions include one or more of: contact entries, suggested search queries, spelling corrections, computing device applications, computing system preferences, document names, folder names, email messages, to-do items, image names, bookmarks, and media file names.

6. The method of claim 1, further comprising:
   displaying at least a third auto-complete menu as a separate menu at a distance from the entry field.

7. The method of claim 1, wherein each auto-complete menu is accessible through the single keystroke by a user when the entry field is in focus.

8. The method of claim 1, wherein each auto-complete menu is accessible through a keyboard shortcut by a user when the entry field is in focus.

9. The method of claim 1, further comprising:
   receiving a user selection of an auto-complete menu;
   in response to receiving the user selection, splitting the selected auto-complete menu into two or more sub-menus, each sub-menu containing a sub-category of suggestions to the suggestions in the auto-complete menu; and
   receiving a user selection of a suggestion in one of the sub-menus to complete the user entry in the entry field.

10. The method of claim 1, further comprising:
    displaying at least a third and a fourth distinct auto-complete menu so that each auto-complete menu is included in a separate display element adjacent to the entry field, wherein the third auto-complete menu is positioned in a third direction relative to the entry field approximately 90 degrees rotated from the first direction, and the fourth auto-complete menu is positioned in a fourth direction relative to the entry field is substantially opposite the third direction.

11. The method of claim 10, wherein each of the first through fourth auto-complete menus are accessible through a different one of four directional keyboard arrows when the entry field is in focus.

12. The method of claim 1, wherein the user input is a first user input, and wherein each of the at least first and second distinct auto-complete menus is displayed in a defined configuration for the first user input, the method further comprising:
receiving a second user input of at least one second character entered into the entry field;
responsive to receiving the second user input, generating two or more suggestions for two or more completed search terms based at least in part on the at least one second character entered into the entry field;
categorizing the two or more suggestions into the at least two categories of suggestions; and
displaying the two categories of suggestions in the at least first and second distinct auto-complete menus in the defined configuration.

13. The method of claim 1, further comprising:
pre-fetching search results corresponding to the two or more suggestions.

14. A computer-implemented method for pre-fetching search query results corresponding to a user entry in a search query box displayed on a user interface of a computing device, the method comprising:
providing a search query box for accepting search terms from a user;
in response to a user entering at least one character into the search query box, generating two or more suggestions for one or more completed search terms;
pre-fetching search results corresponding to the two or more suggestions;
categorizing the search results into at least a first set and a second set; and
displaying the first result set in a first display results box adjacent to and positioned in a first direction perpendicular to a first side of the search query box used for entering the search query; and
displaying the second result set in a second display results box adjacent to and positioned in a second direction perpendicular to a second, different side of the search query box and parallel to the first side of the search query box, wherein each display results box is accessible through a single keystroke user input.

15. The method of claim 14, wherein each display results box has a unique type, and wherein each unique type of the display result boxes is determined based on an application, executed by the computing device, in which the search query box is used.

16. The method of claim 14, wherein the first direction is left of the search query box and the second direction is above the search query box.

17. The method of claim 16, wherein the first direction locates the first display results box above the search query box and the second direction locates the second display results box right of the search query box.

18. The method of claim 16, wherein the first direction locates the first display results box left of the search query box and the second direction locates the second display results box below the search query box.

19. A computer program product, stored on a non-transitory machine-readable medium, for completing a user entry in an entry field displayed on a user interface of a computing device, comprising instructions operable to cause a computer to:
display an entry field on a display of a computing device;
receiving a user input that provides at least one character into the entry field;
categorizing suggestions that correspond to the at least one character in the entry field into one of at least two categories; and
in response to the user input, display two or more distinct auto-complete menus so that each auto-complete menu is included in a separate display element adjacent to the entry field, wherein at least two of the auto-complete menus are positioned in at least two different directions direction approximately parallel to a different side of the entry field, wherein the at least two different directions are perpendicular to each other, wherein each auto-complete menu contains one of the at least two categories of suggestions, and wherein the two or more auto-complete menus are accessible through a single keystroke user input.

* * * * *